June 12, 1934. B. J. FLOCK 1,962,187
DEVICE FOR DETERMINING THE LEVEL OF LIQUID IN A CLOSED ZONE
Filed Nov. 28, 1930
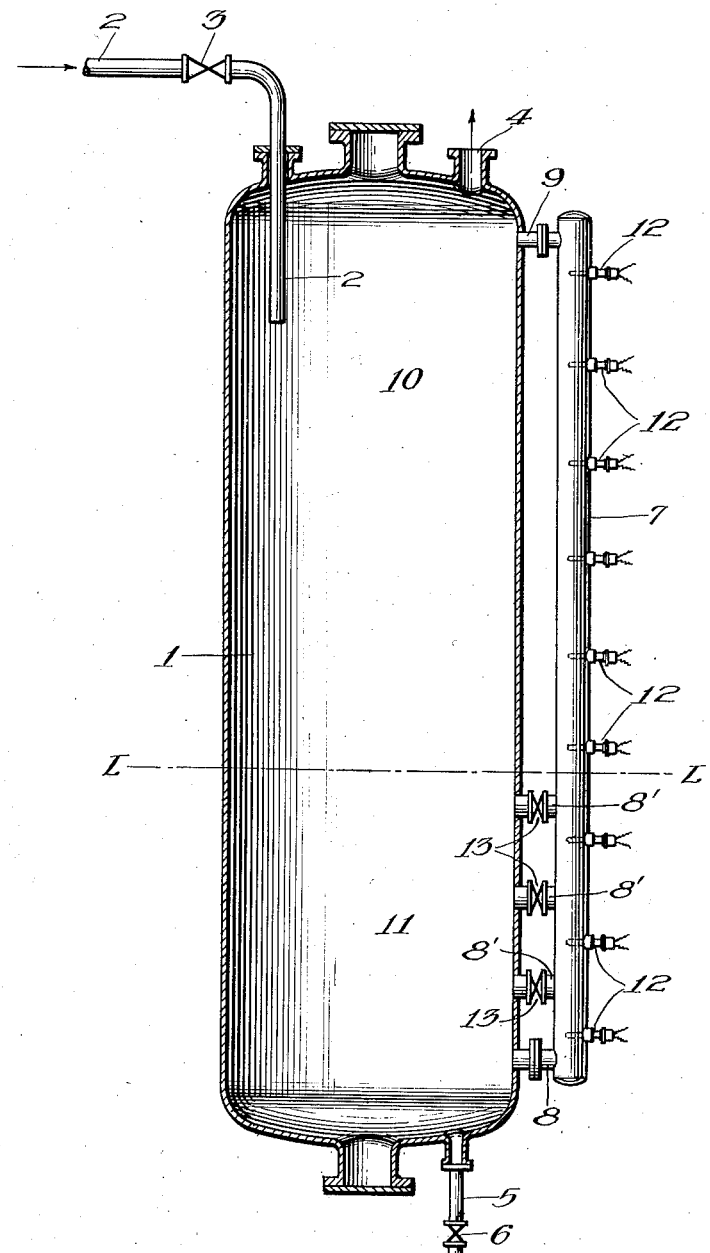

Patented June 12, 1934

1,962,187

UNITED STATES PATENT OFFICE 1,962,187

DEVICE FOR DETERMINING THE LEVEL OF LIQUID IN A CLOSED ZONE

Bernard J. Flock, Chicago, Ill., assignor to Universal Oil Products Company, Chicago, Ill., a corporation of South Dakota Application November 28, 1930, Serial No. 498,634

3 Claims. (Cl. 73—54)

This invention relates to the determination of liquid levels within a closed zone and particularly refers to an improved means of determining the location at any moment of a variable level of heated liquid within a closed zone such as, for example, the level of hydrocarbon oil in the reaction chamber of a cracking system, which zone may be operated under any desired pressure conditions.

While the invention is particularly directed to a means of determining the level of residual liquid in the reaction chamber of a cracking system the determination of the level of any liquid maintained in a closed zone, at a temperature substantially above atmospheric and under any pressure conditions, is within the scope of the invention. The invention applies the principles of vapor condenser and the displacement of relatively heavy cooled liquid by lighter relatively hot liquid to set up, in a zone outside a chamber but communicating therewith, a temperature difference between the liquid and the vapor in said external zone greater than the temperature difference between the body of liquid and the body of vapors within said chamber. The increased temperature differential between the vapor and liquid furnishes a means of more definitely determining the location of the liquid level by means of thermocouples, thermometers or any other form of temperature measuring devices.

The attached diagrammatic drawing more clearly illustrates the principles of the invention as applied to the determination of the level of residual liquid within the reaction chamber of a cracking system. The reaction chamber, shown in vertical cross section, is indicated at 1. Heated hydrocarbon vapors may enter the vapor space 10 of the chamber through line 2 controlled by valve 3. Hydrocarbon vapors may be withdrawn through outlet 4 and unvaporized residual oil may be withdrawn from the lower portion or liquid space 11 of the chamber through line 5 controlled by valve 6.

A level of residual liquid may be maintained within chamber 1. This level may be varied during the operation or it may be desirable to maintain a constant level, but in either case it is expedient to be able to determine the location of this liquid level within definite limits at any desired time during the operation of the process. Gauge glasses have proved unsatisfactory for this purpose both on account of the attendant hazard due to the frequent breakage of the glass and on account of the glass becoming fogged or clouded with heavy residual liquid. Try-cocks are not entirely satisfactory, due to frequent plugging of the lines and also due to the variation in the color of the streams taken from the various strata of the liquid and vapor within the chamber as the operation of the process progresses. When the reaction chamber is operated in the manner hereinbefore described, that is with heated materials introduced into its upper portion and without further heating of the liquid, the vapors are at a slightly higher temperature than the body of the residual oil. This slight difference in temperature has been utilized as a means of determining the liquid level by placing thermometers or thermocouples at various elevations in the chamber. This method is only partially successful as the thermometers or thermocouple wells usually accumulate coke from the products undergoing conversion in the chamber which serves as a heat insulator upon their outer surface, substantially eliminating the slight temperature difference at the various levels.

I have found that by providing an elongated tube or conduit such as indicated at 7, connected with the body of liquid within the chamber at its lower portion through line 8 and connected with the vapor-space of the chamber at its upper end through line 9, a much more pronounced temperature difference exists between the vapor and liquid in the tube 7 and the order is found to be reversed, that is the liquid in tube 7 is higher in temperature than the vapor. I do not claim a full and complete knowledge of the causes of this phenomena but have accepted the following explanation, based upon my observation of the device of the present invention in operation, as the most plausible. Assuming that the level of residual liquid is along line L—L in the drawing, the portion of the tube 7 above this line is, initially, filled with relatively hot vapors from the vapor-space 10 of the chamber and the portion of tube 7 below this line is filled with the somewhat cooler liquid from the liquid space 11 of the chamber. As tube 7 is exposed to the relatively cool atmospheric conditions, the vapors may to a large extent be cooled and condensed in this tube, the relatively cooled condensate flowing into the hotter body of residual oil in the tube, tending to build up the level of liquid above line L—L. The liquid is, of course, also cooled by radiation from tube 7 and the cooled residual liquid together with condensate from the vapors, being of greater density than the hotter liquid in zone 11 of the chamber, is continuously replaced thereby. Apparently, a local circulation set-up within the body of liquid in tube 7, hot liquid from zone 11 of the chamber possibly entering as a sort of core through the central portion of the tube while the relatively cool liquid from the tube may be discharged into zone 11 around the heated core and near the circumference of the tube whereas the upper portion of the tube will, in a short time, become substantially filled with cool uncondensable gas which, owing to its low temperature, may be of greater density than the hot vapors in the vapor space 10 of the chamber and will remain stagnant while the more mobile liquid continues to circulate.

To insure circulation of the residual liquid between the lower portion of tube 7 and the liquid space 11 of chamber 1, in case coke or carbonaceous material is allowed to accumulate in the chamber, a plurality of connecting lines 8' may be provided at various elevations in the height of the chamber. The lines above the one in active use may be closed by suitable valves 13 which may be opened when the lower lines become clogged with coke or when the coke in the chamber builds up to the level of the lower lines. It will be understood, of course, that these lines are not permitted to communicate with the vapor space in the chamber.

To determine the temperature in various portions of tube 7, thermocouples, thermometers or any other suitable form of temperature measuring devices indicated at 12 may be located at intervals along the height of tube 7, the accuracy with which it is desired to determine the liquid level will regulate the spacing of the thermocouples. Preferably the thermocouples may extend to the central portion of tube 7 so that the temperature of the relatively hot core of liquid hereinbefore referred to, may be obtained below the liquid level. Thermocouples, if such are used, may be connected to temperature indicating or temperature recording devices and it is evident that by means illustrated and described the location of the liquid level within the chamber may be determined at any desired time with a degree of accuracy limited only by the spacing of the thermocouples along tube 7.

It has been found that the device such as illustrated not only gives a greater temperature difference between the liquid and vapor, thus permitting a more positive and accurate determination of the liquid level, but also that the deposition of coke upon thermocouples or thermometer wells in a tube attached to the reaction chamber as illustrated is much less than when the wells are located within the chamber proper.

As a specific example of the operation of the device, it has been found that, in certain cracking operations, the temperature difference between the residual liquid and the vapors within the reaction chamber, as measured relatively close to the surface of the liquid, is practically negligible and when the two temperatures are taken at two points located respectively in the liquid and in the vapor and approximately 12 inches apart, the temperature difference may be only some 30° F., or thereabouts, whereas, the temperature difference between the liquid and vapor in a tube such as shown in the attached drawing may be some 200° F. more or less when measured at two points located respectively in the liquid and in the vapor and only 6 inches or thereabouts apart.

I claim as my invention:

1. In combination, a chamber, a fluid inlet and outlet for said chamber, an enclosed vessel associated with said chamber and provided with communicating means with said chamber at its upper and lower portions, further communicating means between said chamber and vessel adapted to effect a local circulation of fluid between their lower portions, and means spacedly disposed along said enclosed vessel responsive to the temperature conditions prevailing therein.

2. In combination, a reaction chamber adapted to receive liquids and vapors under treatment, an inlet and outlet therefor, an elongated receptacle relatively restricted in cross-section disposed adjacent said reaction chamber and communicating therewith, means for passing vapors and gases into the upper portion of said receptacle, means for passing liquids into the lower portion thereof, further means for maintaining a local circulation of said liquids between said chamber and receptacle, and thermo-responsive means spacedly disposed along said elongated receptacle.

3. A reaction chamber, comprising in combination, an enclosed vessel having an inlet and outlet for heated fluid and outlets for separated liquid and vapors, a second enclosed vessel relatively restricted in cross-section disposed adjacent said first enclosed vessel, means connecting the upper and lower portions of said second enclosed vessel to said first enclosed vessel, additional means associated with the lower portion of said second enclosed vessel for cyclically and locally circulating liquid between said vessels, and thermo-responsive means disposed throughout the length of said second enclosed vessel.

BERNARD J. FLOCK.